United States Patent
Gildein, II et al.

(10) Patent No.: US 9,984,674 B2
(45) Date of Patent: May 29, 2018

(54) COGNITIVE COMPUTING ENABLED SMARTER CONFERENCING

(71) Applicant: International Business Machines Corporation, Armonk, NY (US)

(72) Inventors: Michael E. Gildein, II, Wappingers Falls, NY (US); Vijai Kalathur, Wappingers Falls, NY (US); Rajaram B. Krishnamurthy, Pleasant Valley, NY (US); Moses J. Vaughan, Mahwah, NJ (US)

(73) Assignee: International Business Machines Corporation, Armonk, NY (US)

(*) Notice: Subject to any disclaimer, the term of this patent is extended or adjusted under 35 U.S.C. 154(b) by 297 days.

(21) Appl. No.: 14/852,762

(22) Filed: Sep. 14, 2015

(65) Prior Publication Data
US 2017/0076713 A1    Mar. 16, 2017

(51) Int. Cl.
| | |
|---|---|
| G10L 15/20 | (2006.01) |
| G10L 13/04 | (2013.01) |
| G10L 15/26 | (2006.01) |
| G10L 21/0272 | (2013.01) |
| G10L 21/034 | (2013.01) |
| H04N 7/15 | (2006.01) |
| G06F 17/27 | (2006.01) |
| G10L 13/08 | (2013.01) |
| G10L 21/00 | (2013.01) |
| G10L 15/00 | (2013.01) |
| G06Q 10/00 | (2012.01) |
| G06F 3/00 | (2006.01) |
| G06F 3/048 | (2013.01) |
| H04M 1/64 | (2006.01) |
| H04M 3/42 | (2006.01) |
| G06F 15/16 | (2006.01) |
| H04N 7/14 | (2006.01) |
| G06F 17/28 | (2006.01) |

(52) U.S. Cl.
CPC .......... *G10L 13/043* (2013.01); *G10L 15/265* (2013.01); *G10L 21/0272* (2013.01); *G10L 21/034* (2013.01); *H04N 7/15* (2013.01); *G06F 17/289* (2013.01)

(58) Field of Classification Search
USPC .................... 704/232–260; 379/88.01–202.01
See application file for complete search history.

(56) References Cited

U.S. PATENT DOCUMENTS

| | | |
|---|---|---|
| 6,292,769 B1 | 9/2001 | Flanagan et al. |
| 8,495,727 B2 | 7/2013 | Ramanathan et al. |
| 9,245,522 B2 * | 1/2016 | Hager .................. G06F 17/273 |

(Continued)

*Primary Examiner* — Neeraj Sharma
(74) *Attorney, Agent, or Firm* — Gilbert Harmon, Jr.

(57) ABSTRACT

An approach for augmenting a teleconference based on cognitive computing. A teleconference transcript is created based on speech-to-text conversion. A portion of the teleconference transcript is replaced based on a substitute word store and on cognitive computing text substitution. A second teleconference transcript and text-to-speech conversion creates augmented real-time audio. Participant audio and augmented audios are combined to create and output augmented audio to teleconference participants. Audio augmentation includes noise reduction, volume normalization, content change and natural language translation.

17 Claims, 4 Drawing Sheets

(56) References Cited

U.S. PATENT DOCUMENTS

| | | | |
|---|---|---|---|
| 2004/0064317 A1* | 4/2004 | Othmer | G06Q 10/10 704/260 |
| 2009/0089086 A1* | 4/2009 | Schoenberg | G06Q 30/08 705/2 |
| 2009/0259464 A1* | 10/2009 | Ducheneaut | H04N 7/15 704/232 |
| 2010/0283829 A1 | 11/2010 | De Beer et al. | |
| 2011/0004114 A1 | 1/2011 | Schenck | |
| 2011/0112833 A1* | 5/2011 | Frankel | G10L 15/32 704/235 |
| 2012/0191454 A1* | 7/2012 | Gabara | G10L 17/00 704/246 |
| 2014/0244252 A1* | 8/2014 | Dines | G10L 15/183 704/235 |
| 2015/0012270 A1* | 1/2015 | Reynolds | G10L 25/84 704/233 |
| 2015/0067026 A1* | 3/2015 | Christiansen | H04L 12/1831 709/203 |
| 2015/0106091 A1* | 4/2015 | Wetjen | G10L 15/26 704/235 |
| 2015/0350451 A1* | 12/2015 | Aue | H04M 3/568 379/202.01 |

* cited by examiner

COGNITIVE COMPUTING ENABLED SMARTER CONFERENCING

BACKGROUND OF THE INVENTION

The present invention relates generally to the field of telecommunications, and more particularly to the fields of teleconferencing and cognitive computing.

A teleconference is the live exchange and mass articulation of information among persons and machines remote from one another but linked by a telecommunications system or network. The telecommunications system can support the teleconference by providing one or more audio, and/or data services by one or more telephony means (e.g., landline, voice over internet protocol (VoIP), mobile or smartphone).

Cognitive computing systems make context computable by identifying and extracting patterns from history or profiles and presenting information sets appropriate for a dependent application engaged in a specific process at a specific time and place. The ability to enable cognitive computing to augment teleconferencing sessions provides teleconference participants with sound clarity and an enhanced content experience.

SUMMARY

As disclosed herein, a method for augmenting a teleconference based on cognitive computing, the method comprising: creating a first one or more teleconference transcripts based on speech-to-text conversion of one or more authentic audio; replacing, based on a first one or more substitute word store, a portion of the one or more teleconference transcripts content, based on cognitive computing text substitution, creating a second one or more teleconference transcripts; creating one or more real-time synthetic voice audios based on the second one or more teleconference transcripts; combining the one or more authentic audio and the one or more real-time synthetic voice audios, creating one or more augmented teleconference audio and outputting the one or more augmented teleconference audio to teleconference participants. A computer system and a computer program product corresponding to the above method are also disclosed herein.

DETAILED DESCRIPTION

While teleconferencing technology has provided the ability for multiple participants to communicate without the need to be in a single location, those participants often experience distracting background noise, poor voice quality, intermittent loss of voice and fluctuating speaker volume levels. By utilizing cognitive computing capabilities, useful enhancements can greatly improve teleconference call experience. Embodiments of the present invention provide systems, methods and computer program products for background noise and voice filtering, sound volume normalization, text substitution and translation. Embodiments described herein use cognitive computing capabilities, teleconference participant profiles and real-time call processing to augment teleconference call experience.

Call experience improvement can be managed by a central call hub and/or distributed among individual teleconference participant smartphones. Embodiments of the present invention use digital information received for each teleconference participant connection to determine desired and undesired noise, sound levels and contextual content. The resulting noise filtered and context corrected audio content is delivered to each teleconference participant in their preferred natural language in near real-time.

Noise reduction, embodied in the present invention, surpasses typical digital modulation by using voiceprint established in teleconference participant profiles to blank background voices and by dynamically muting other teleconference lines during speech. Corrected audio content includes, but is not limited to, using one or more teleconference substitute word stores to enable blanking out inappropriate or sensitive words, automatically filling in words or word fragments that are not clear, acronym or terminology conversion to local vernacular and providing near real time translation to natural languages. It should be noted that embodiments of the present invention are described in context of teleconferencing and can also be applied to the audio portion of video conferencing technology.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
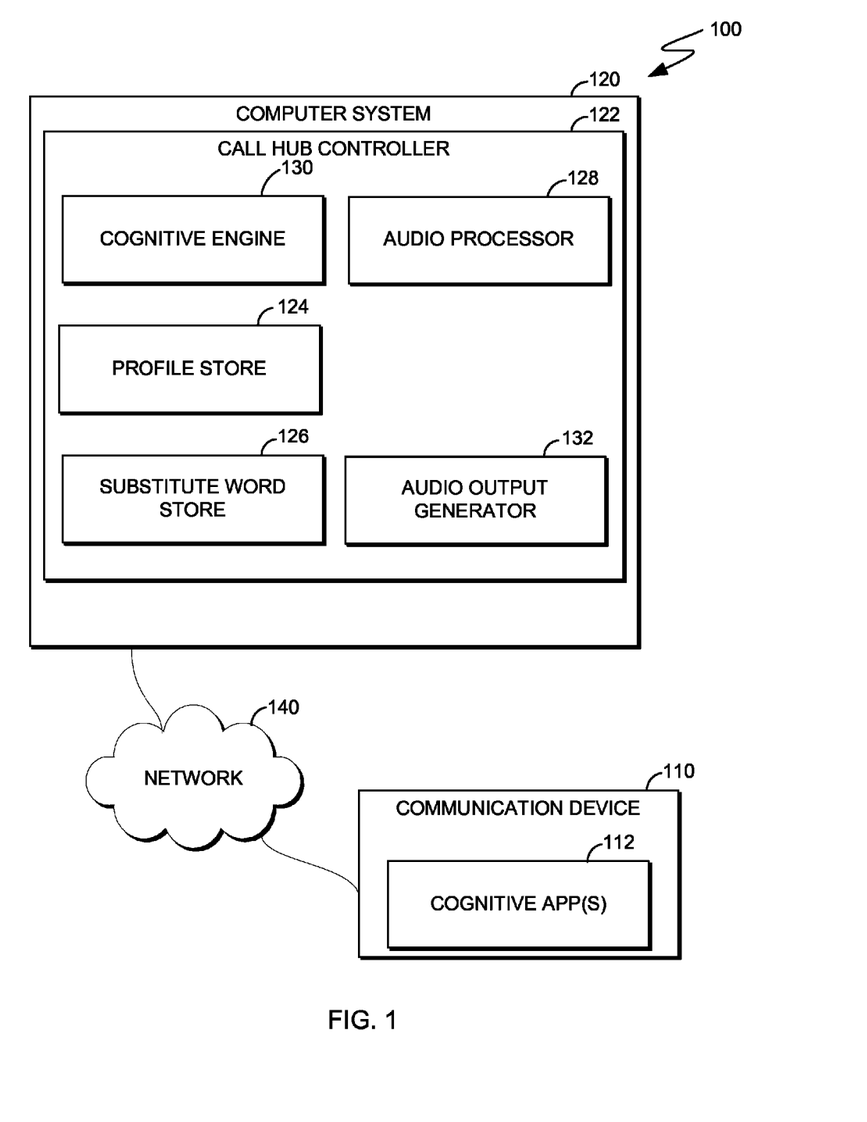
FIG. 1 is a functional block diagram illustrating a computing environment, in accordance with an embodiment of the present invention.

FIG. 1 is a functional block diagram of computing environment 100, in accordance with an embodiment of the present invention. Computing environment 100 comprises communication device 110 and computer system 120, interconnected via network 140.

Communication device 110 is connected to a teleconference and provides the capability to operate cognitive app(s) 112 locally. Operation of cognitive app(s) 112 is dependent on the technology used as communication device 110. For example, traditional wired telephone is deficient of smartphone capability and therefore not capable of cognitive app(s) 112 operation. Embodiments of the present invention allow for a range of communication device 110 implementations and allow local teleconference augmentation function for communication device 110 with cognitive app(s) 112. For example, cognitive app(s) 112 can locally filter noise, translate speech or substitute words which are further described in context of computer system 120. In general, communication device 110 is representative of any electronic device, or combination of electronic devices, capable of executing computer readable program instructions, as described in greater detail with regard to FIG. 4.

Computer system 120 can be desktop computers, laptop computers, specialized computer servers, or the like. In certain embodiments, computer system 120 represents computer systems utilizing clustered computers and components acting as a single pool of seamless resources via network 140. For example, such embodiments can be used in data center, cloud computing, storage area network (SAN) and network attached storage (NAS) applications. In general, computer system 120 is representative of any electronic devices, or combination of electronic devices, capable of executing computer readable program instructions, as described in greater detail with regard to FIG. 4.

Network 140 can be, for example, a local area network (LAN), a wide area network (WAN) such as the Internet, or a combination of the two and include wired, wireless, or fiber optic connections. In general, network 140 can be any combination of connections and protocols that will support communications between communication device 110 and computer system 120, in accordance with an embodiment of the present invention.

In one embodiment of the present invention, computer system 120 comprises, call hub controller 122. Call hub controller 122 manages general teleconference function including analog to digital signal processing (not depicted), storage of completed teleconference sessions (not depicted) and operational components of embodiments of the present invention. It should be noted that call hub controller 122 implementation provides for predetermined teleconference profile settings and moderator setting control (not depicted) to establish default functions of the teleconference augmentation.

In one embodiment of the present invention, call hub controller 122 comprises, profile store 124, substitute word store 126, audio processor 128, cognitive engine 130 and audio output generator 132.

Computer system 120 contains any commercial or custom products necessary to manage teleconferencing, process audio and perform cognitive processing. In this embodiment of the present invention, call hub controller 122 integrates cognitive engine 130, in other embodiments call hub controller 122 and cognitive engine 130 can be separate components. Further, audio processor 128, profile store 124, audio output generator 132 and substitute word store 126 can be any combination of separate or integrated components.

In one embodiment of the present invention, audio processor 128 consists of one or more audio processors 128. An embodiment of the present invention uses audio processor(s) 128 to poll all teleconference connections for audio conditioning and content augmentation.

In one embodiment of the present invention, profile store 124, consists of one or more profile stores 124. An embodiment of the present invention comprises profile store(s) 124 to register each calling device and information such as but not limited to call identifier, language used, voiceprint, volume level and background noise. Profile store(s) 124 is a historic record of teleconference metrics that cognitive engine 130 uses as corpus for continuous learning and adaptation. It should be noted that voiceprints can be established by sampling audio to create spectrograms or other data objects during teleconference sessions and become profile store(s) 124 corpus. In embodiments of the present invention, teleconference participants can establish historic records for their calling device(s) independent of a multiple participant teleconference session to establish initial cognitive computing training (not depicted).

In one embodiment of the present invention, substitute word store 126 consists of one or more substitute word stores 126. In an embodiment of the present invention substitute word store(s) 126 is a record of sensitive words, acronyms, word fragments, vernacular or any other lexica used for text substitution. Substitute word store(s) 126 can be provided by various methods, including but not limited to, an administration process or by cognitive engine 130 corpus ingestion.

In one embodiment of the present invention, cognitive engine 130 consists of one or more cognitive engines 130. An embodiment of the present invention uses cognitive engine(s) 130 to provide cognitive computing which continuously learns and adapts through real-time ingestion of data during a teleconference session and through historic contextual knowledge provided by profile store(s) 124 and substitute word store(s) 126. Cognitive engine(s) 130 provides context relevant modification results for audio conditioning and audio output augmentation.

In one embodiment of the present invention, audio output generator 132 consists of one or more audio output generators 132. An embodiment of the present invention uses audio output generator(s) 132 to combine conditioned audio (i.e., noise filtered, volume normalized) audio with text substitution provided by text-to-speech converter and further provides natural language translation audio. It should be noted that natural language translation function can be enabled by various methods including, but not limited to, call hub controller 122 teleconference profile settings, moderator settings, profile store 124, or cognitive app(s) 110 for each teleconference participant.

Figure 2:
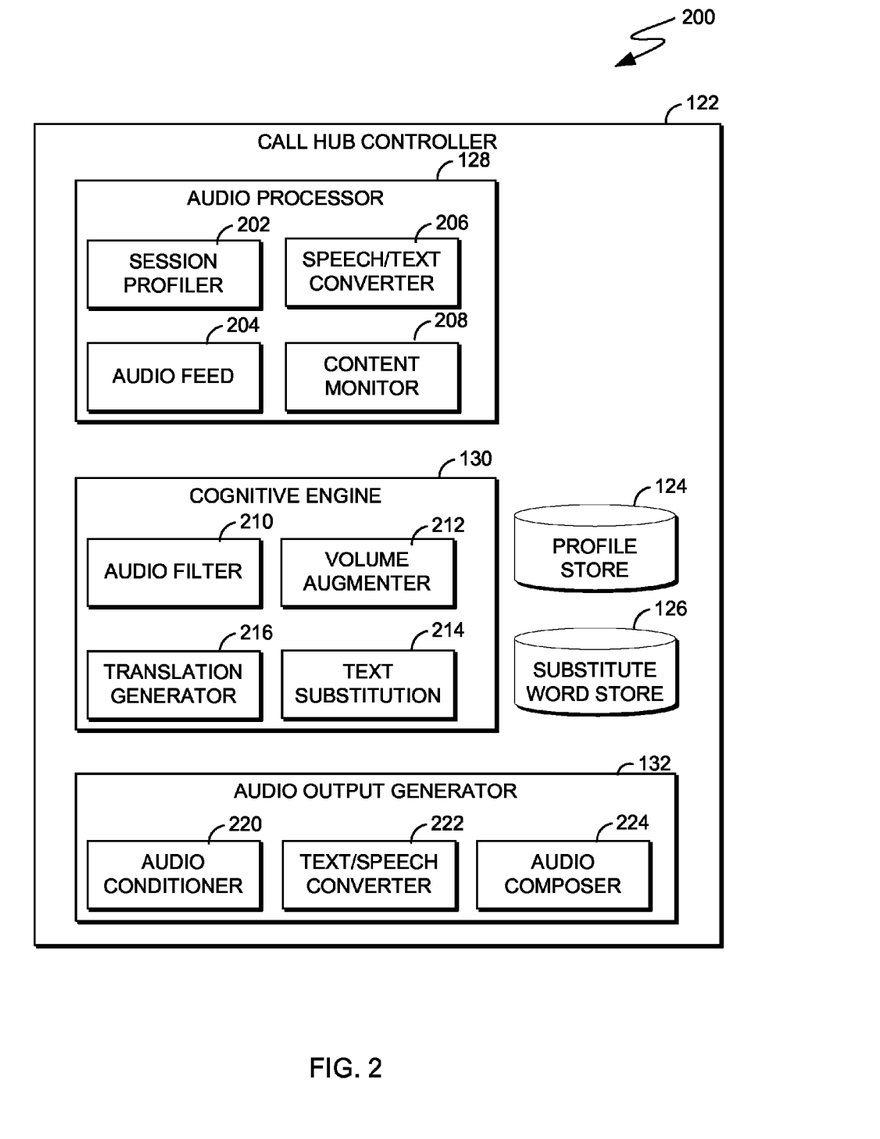
FIG. 2 is a block diagram illustrating an example cognitive computing enabled teleconferencing hub, in accordance with an embodiment of the present invention.

FIG. 2 is a block diagram illustrating an example cognitive computing enabled teleconferencing hub functional components in accordance with an embodiment of the present invention. The teleconference augmentation diagram 200, in accordance with one embodiment of the present invention, comprises call hub controller 122, profile store 124, substitute word store 126, audio processor 128, cognitive engine 130 and audio output generator 132 as described in FIG. 1. Further, audio processor 128 comprises, session profiler 202, audio feed 204, speech/text converter 206, content monitor 208; cognitive engine 130 comprises audio filter 210, volume augmenter 212, text substitution 214, translation generator 216; and audio output generator 132 comprises audio conditioner 220, text/speech converter 222, and audio composer 224.

In one embodiment of the present invention, session profiler 202 can create or open a related teleconference participant profile in profile store 124. As teleconference participants join or exit a teleconference, connection attributes such as, but not limited to, call identifier (e.g., caller ID), language used, voiceprint, volume level and background noise are stored to distinguish each teleconference participant connection. Background noise is the audio absent of a voiceprint.

In one embodiment of the present invention, audio feed 204 can store original digital voice audio for processing by audio filter 210, volume augmenter 212 and speech/text converter 206. Further, audio conditioner 220 can use audio feed 204 during teleconference operation.

In one embodiment of the present invention, speech/text converter 206 is a speech-to-text converter that converts audio feed 204 to transcript text for use by content monitor 208.

In one embodiment of the present invention, content monitor 208 can pass transcript text towards text substitution 214 when a word, acronym or portion of a word of the transcript text exists in substitute word store 126.

In one embodiment of the present invention, audio filter 210 can poll teleconference attributes such as, but not limited to, background noise and voiceprint to adjust audio feed 204 sound characteristics. Polling frequency and duration can be implemented as any combination of time based or event driven operation using any combination of predetermined settings or automation. Filtering adjustments to reduce noise and isolate other background voices from a speaking voice are provided to audio conditioner 220 and become corpus of profile store 124 for cognitive engine 130 learning.

In one embodiment of the present invention, volume augmenter 212 can poll teleconference attributes such as, but not limited to, volume level to adjust audio feed 204 sound volume characteristics for each teleconference connection. Adjustments to reduce or increase speech volume are provided to audio conditioner 220 and become corpus of profile store 124 for cognitive engine 130 learning.

In one embodiment of the present invention, text substitution 214 can determine the most likely substitution text when provided with a word, sentence, sentence fragment or other word fragment. Text substitution 214 will replace, expand or contract a word or sentence in the teleconference transcript considering context of the conversation provided by content monitor 208. For example, an acronym can be expanded to full meaning, a sensitive word can be censored or replaced or a word fragment (e.g., full word lost in noise) can be replaced with a predicted word. Text substitution 214 provides augmented transcript to text/speech converter 222 and/or translation generator 216 as required by teleconference session.

In one embodiment of the present invention, translation generator 216 can convert teleconference transcript text to natural language needs of each teleconference participant. Translation generator 216 can use profile store 124 or teleconference profile settings of the call hub controller 122 to determine which language to convert to, and from. Translation generator 216 receives text substitutions from text substitution 214 in one embodiment of the present invention. In other embodiments of the present invention content monitor 208 and text substitution 214 can be used in differing combinations to produce desired results In one embodiment of the present invention, audio conditioner 220 can modify audio information from audio feed 204 with adjustments provided from audio filter 210 and volume augmenter 212. The conditioned audio with reduced background noise and adjusted volume is provided to audio composer 224 for processing.

In one embodiment of the present invention, text/speech converter 222 is a text-to-speech converter that creates synthetic speech for output from text substitution 214 and translation generator 216. In embodiments of the present invention, the speech voice can be gender neutral. In other embodiments of the present invention, profile store 124 or call hub controller 122 teleconference profile settings can provide gender simulation based on speaker voiceprint gender. Further embodiments of the present invention can provide speech voice selection from a predetermined list by a teleconference participant or automatically selected based on closest voiceprint match (e.g., pitch, accent, etc.).

In one embodiment of the present invention, audio composer 224 can combine conditioned audio from audio conditioner 220 and speech from text/speech converter 222. The audio conditioned, authentic voice (original voice from audio feed 204) will be provided when the base language of the teleconference speaker and teleconference participant is common. When text substitution is introduced (e.g., acronym, sensitive word, etc.), audio from text/speech converter 222 replaces the original audio word or phrase with a synthetic voice. In the case where translation generator 216 provides alternate natural language, audio composer 224 combines audio conditioner 220 and the natural language synthetic voice audio. Some embodiments can provide audio indicators such as, but not limited to, modified voice pitch or generic sound, to alert a teleconference participant where text substitution 214 exists.

Another feature audio composer 224 and call hub controller 122 can provide is a "dynamic lecture mode." Audio composer 224 can sequence or delay other conversations in situations where teleconference participants speak simultaneously. In another embodiment of the present invention audio composer 224 can mute other teleconference participant connections to prevent interfering with the primary speaker. When dynamic lecture mode is activated an indicator, such as a beep or other audio alert can be provided to notify teleconference participants.

Figure 3:
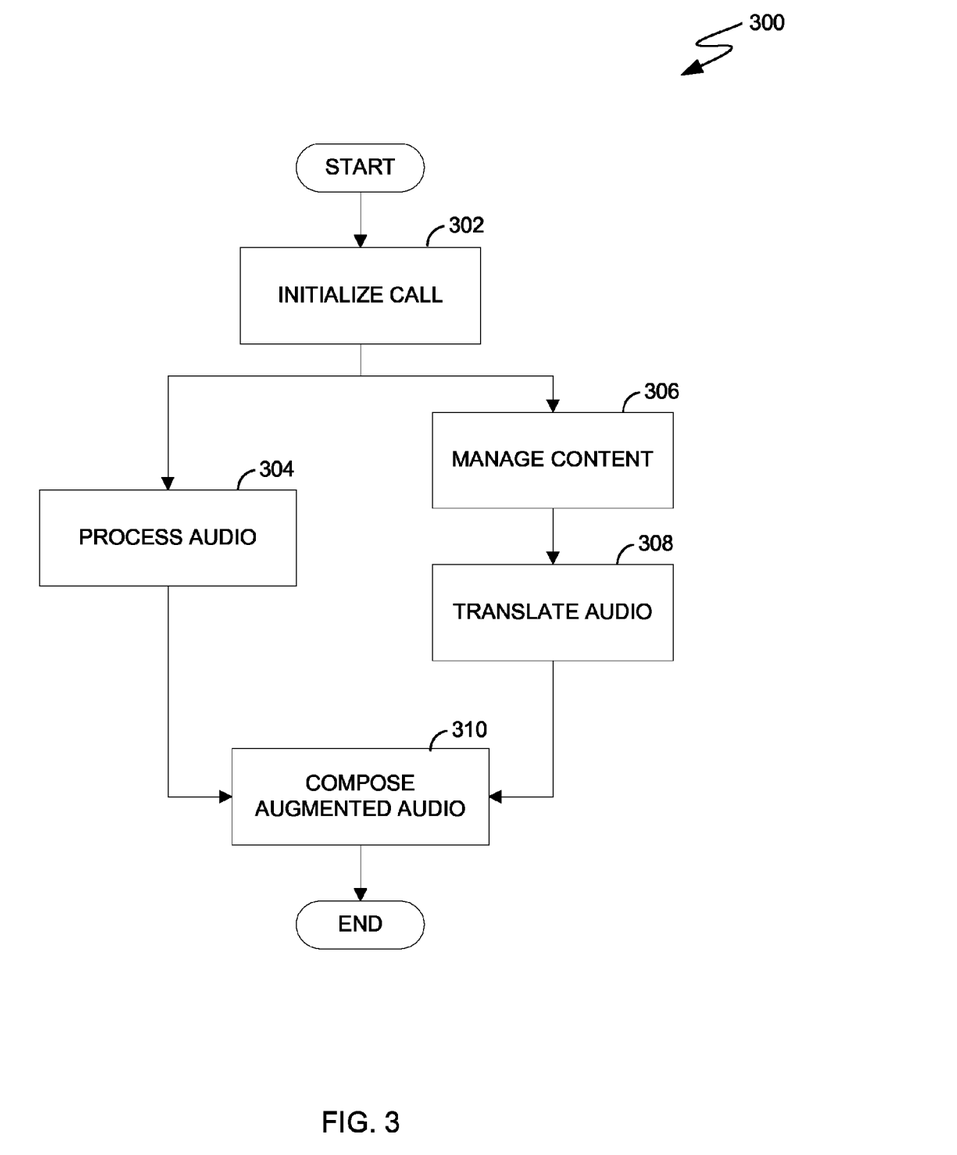
FIG. 3 is a flowchart depicting teleconference augmentation steps within the data processing environment of FIG. 1, in accordance with an embodiment of the present invention.

FIG. 3 is a flowchart depicting teleconference augmentation steps, in accordance with an embodiment of the present invention. Step 302 initialize call, in teleconference augmentation flow 300, uses user session profiler 202 to open or create a call profile record in profile store 124. Teleconference profile settings and settings in profile store 124 are used to establish initial call volume, noise levels for each teleconference participant and can include, but are not limited to, determining native language and voiceprint of the teleconference participant. It should be noted that embodiments of the present invention can predetermine teleconference participant native language from pre-established teleconference profile settings. In other embodiments of the present invention, native language can be automatically determined based on transcript content of each teleconference participant.

Teleconferencing audio augmentation can fit two categories. The first category in step 304, process audio, uses volume augmenter 212, audio filter 210 and audio conditioner 220 to normalize volume level of all teleconference participants in a teleconference session and to filter background and noise inconsistent with the voiceprint of the teleconference participant respectively. The use of voiceprint as a filtering mechanism provides the ability to remove other voices in the background that would normally interfere with the primary speaker.

There second category of teleconference audio augmentation is content management. Step 306 manage content uses speech/text 206 to create a transcript for content monitor 208 to process with substitute word store 126 corpus. When records are found (e.g., acronyms, sensitive words) text substitution 214 is operated using contextual elements provided from the teleconference session to expand or replace acronyms, word fragments, vernacular, etc. Embodiments of the present invention provide text substitution 214 to censor by blanking or replacing sensitive words with an audio alert such as, but not limited to, a beep or preferred word. Other embodiments of the present invention provide translation or substitution of technical terms into local vernacular or language level of teleconference participants.

Step 308 translate audio provides text/speech convertor 222 to create synthetic voice audio for text substitution 214 and further, if an alternate natural language is provided to a teleconference participant, translation generator 216 is incorporated.

Step 310 compose augmented audio uses audio composer 224 to combine conditioned audio from step 304 (audio conditioner 220) with content managed audio in step 308 (text/speech converter 222) to provide augmented audio output that contains the authentic speaker voice combined with synthetic voice where word or phrase substitutions are encountered. Further, natural language translation output is composed with synthetic voice from combined content managed audio and authentic audio.

It should be noted that embodiments of the present invention are described in context of a real-time operation. Other embodiments of the present invention allow for a saved teleconference to be reprocessed for subsequent use. For example, a saved teleconference session used for playback could be retrieved from storage and processed to inject additional word/phrase substitutions to meet formal corporate guidelines prior to final playback publication or general audience distribution.

Figure 4:
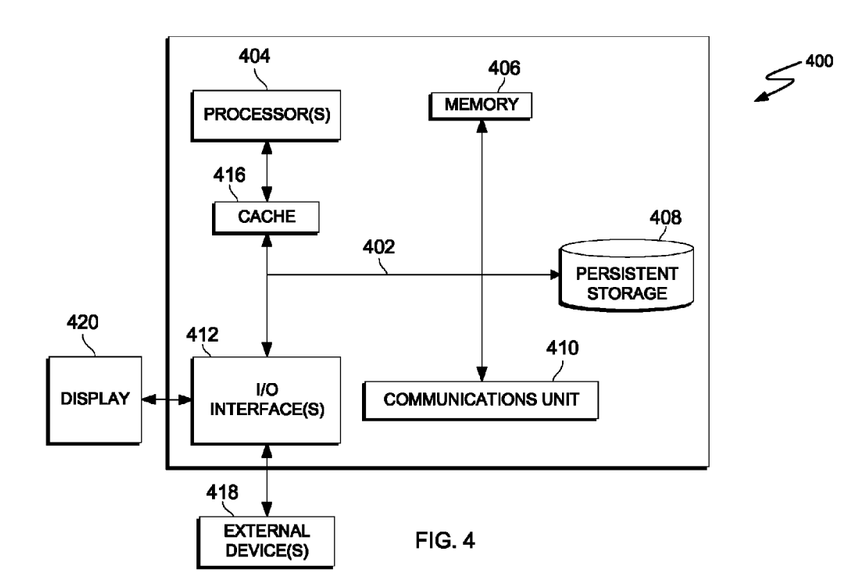
FIG. 4 depicts a block diagram of components of the server and/or the computing device, in accordance with an embodiment of the present invention.

FIG. 4 depicts a block diagram of components of communication device 110 and computer system 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Communication device 110 and computer system 120 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for augmenting a teleconference based on cognitive computing, the method comprising:
    creating a first one or more teleconference transcripts based on speech-to-text conversion of one or more authentic audio;
    creating one or more teleconference session profiles wherein the one or more teleconference session profiles provide natural language and gender settings;
    replacing, based on a first one or more substitute word store, a portion of the one or more teleconference transcripts content, based on cognitive computing text substitution, creating a second one or more teleconference transcripts;
    creating one or more real-time synthetic voice audios based on the second one or more teleconference transcripts;
    creating one or more real-time natural language translations, based on at least one of the first one or more teleconference transcripts or the second one or more teleconference transcripts;
    combining the first one or more teleconference transcripts and second one or more teleconference transcripts, creating an augmented natural language teleconference transcript;

creating one or more augmented real-time natural language synthetic voice audio based on the augmented natural language teleconference transcript;
combining the one or more authentic audio and the one or more real-time synthetic voice audios, creating one or more augmented teleconference audio; and
outputting the one or more augmented teleconference audio and the one or more augmented real-time natural language synthetic voice audio, based on the one or more teleconference session profiles, to teleconference participants.

2. The method of claim 1, wherein cognitive computing can be provided by at least one of one or more call hub controllers and one or more local communication devices.

3. The method of claim 1, further comprising:
creating one or more teleconference session profiles wherein the one or more teleconference session profiles are corpus for cognitive computing functions;
filtering noise of teleconference session audio based on one or more teleconference connection characteristics and voiceprints from the one or more teleconference session profiles to isolate participant speaking voice from background voices, creating one or more noise filtered audio;
normalizing volume of the teleconference session audio based on the one or more teleconference connection characteristics and the one or more teleconference session profiles creating one or more normalized volume audios; and
combining the one or more noise filtered audio and the one or more normalized volume audios with the one or more augmented teleconference audio creating one or more filtered augmented teleconference audio.

4. The method of claim 1, wherein the second one or more teleconference transcripts provides an indicator to produce at least one of a beep and synthetic voice pitch change, based on replacing fragmented words, acronyms, sensitive words/phrases and technical terms.

5. The method of claim 1, wherein outputting the augmented teleconference audio is controlled by muting or delaying output when there are simultaneous speakers.

6. The method of claim 1, wherein the one or more authentic audio is the one or more augmented teleconference audio and is reprocessed based on replacing the first one or more substitute word store with a second one or more substitute word store.

7. A computer program product for augmenting teleconferences using cognitive computing, the computer program product comprising:
one or more computer readable storage media and program instructions stored on the one or more computer readable storage media, the program instructions comprising:
program instructions to, create a first one or more teleconference transcripts based on speech-to-text conversion of one or more authentic audio;
program instructions to, create one or more teleconference session profiles wherein the one or more teleconference session profiles provide natural language and gender settings;
program instructions to, replace, based on a first one or more substitute word store, a portion of the one or more teleconference transcripts content, based on cognitive computing text substitution, creating a second one or more teleconference transcripts;
program instructions to, create one or more real-time synthetic voice audios based on the second one or more teleconference transcripts;
program instructions to, create one or more real-time natural language translations, based on at least one of the first one or more teleconference transcripts or the second one or more teleconference transcripts;
program instructions to, combine the first one or more teleconference transcripts and second one or more teleconference transcripts, creating an augmented natural language teleconference transcript;
program instructions to, create one or more augmented real-time natural language synthetic voice audio based on the augmented natural language teleconference transcript;
program instructions to, combine the one or more authentic audio and the one or more real-time synthetic voice audios, creating one or more augmented teleconference audio; and
program instructions to, output the one or more augmented teleconference audio and the one or more augmented real-time natural language synthetic voice audio, based on the one or more teleconference session profiles, to teleconference participants.

8. The computer program product of claim 7, wherein cognitive computing can be provided by at least one of one or more call hub controllers and one or more local communication devices.

9. The computer program product of claim 7, further comprising:
program instructions to, create one or more teleconference session profiles wherein the one or more teleconference session profiles are corpus for cognitive computing functions;
program instructions to, filter noise of teleconference session audio based on one or more teleconference connection characteristics and voiceprints from the one or more teleconference session profiles to isolate participant speaking voice from background voices, creating one or more noise filtered audio;
program instructions to, normalize volume of the teleconference session audio based on the one or more teleconference connection characteristics and the one or more teleconference session profiles creating one or more normalized volume audios; and
program instructions to, combine the one or more noise filtered audio and the one or more normalized volume audios with the one or more augmented teleconference audio creating one or more filtered augmented teleconference audio.

10. The computer program product of claim 7, wherein the second one or more teleconference transcripts provides an indicator to produce at least one of a beep and synthetic voice pitch change, based on replacing fragmented words, acronyms, sensitive words/phrases and technical terms.

11. The computer program product of claim 7, wherein outputting the augmented teleconference audio is controlled by muting or delaying output when there are simultaneous speakers.

12. The computer program product of claim 7, wherein the one or more authentic audio is the one or more augmented teleconference audio and is reprocessed based on replacing the first one or more substitute word store with a second one or more substitute word store.

13. A computer system for augmenting teleconferences using cognitive computing, the computer system comprising:

one or more computer processors;
one or more computer readable storage media;
program instructions stored on the one or more computer readable storage media for execution by at least one of the one or more computer processors, the program instructions comprising:
  program instructions to, create a first one or more teleconference transcripts based on speech-to-text conversion of one or more authentic audio;
  program instructions to, create one or more teleconference session profiles wherein the one or more teleconference session profiles provide natural language and gender settings;
  program instructions to, replace, based on a first one or more substitute word store, a portion of the one or more teleconference transcripts content, based on cognitive computing text substitution, creating a second one or more teleconference transcripts;
  program instructions to, create one or more real-time synthetic voice audios based on the second one or more teleconference transcripts;
  program instructions to, create one or more real-time natural language translations, based on at least one of the first one or more teleconference transcripts or the second one or more teleconference transcripts;
  program instructions to, combine the first one or more teleconference transcripts and second one or more teleconference transcripts, creating an augmented natural language teleconference transcript;
  program instructions to, create one or more augmented real-time natural language synthetic voice audio based on the augmented natural language teleconference transcript;
  program instructions to, combine the one or more authentic audio and the one or more real-time synthetic voice audios, creating one or more augmented teleconference audio; and
  program instructions to, output the one or more augmented teleconference audio and the one or more augmented real-time natural language synthetic voice audio, based on the one or more teleconference session profiles, to teleconference participants.

14. The computer system of claim 13, wherein cognitive computing can be provided by at least one of one or more call hub controllers and one or more local communication devices.

15. The computer system of claim 13, further comprising:
  program instructions to, create one or more teleconference session profiles wherein the one or more teleconference session profiles are corpus for cognitive computing functions;
  program instructions to, filter noise of teleconference session audio based on one or more teleconference connection characteristics and voiceprints from the one or more teleconference session profiles to isolate participant speaking voice from background voices, creating one or more noise filtered audio;
  program instructions to, normalize volume of the teleconference session audio based on the one or more teleconference connection characteristics and the one or more teleconference session profiles creating one or more normalized volume audios; and
  program instructions to, combine the one or more noise filtered audio and the one or more normalized volume audios with the one or more augmented teleconference audio creating one or more filtered augmented teleconference audio.

16. The computer system of claim 13, wherein the second one or more teleconference transcripts provides an indicator to produce at least one of a beep and synthetic voice pitch change, based on replacing fragmented words, acronyms, sensitive words/phrases and technical terms.

17. The computer system of claim 13, wherein outputting the augmented teleconference audio is controlled by muting or delaying output when there are simultaneous speakers.

* * * * *